W. T. CARROLL.

Spinning-Ring.

No. 6,386. Reissued April 20, 1875.

Witnesses

L. H. Lalemee.

Wm Pratt.

Inventor.

George Draper & Wm F. Draper
Assees of Wm T. Carroll
PER Crosby & Gregory
ATTYS.

UNITED STATES PATENT OFFICE.

WILLIAM T. CARROLL, OF WORCESTER, ASSIGNOR TO GEORGE DRAPER AND WILLIAM F. DRAPER, OF HOPEDALE, MASSACHUSETTS.

IMPROVEMENT IN SPINNING-RINGS.

Specification forming part of Letters Patent No. 89,025, dated April 20, 1869; reissue No. 6,386, dated April 20, 1875; application filed March 17, 1875.

*To all whom it may concern:*

Be it known that WILLIAM T. CARROLL, of the city and county of Worcester, and State of Massachusetts, did invent an Improved Ring for Spinning-Frame, of which the following is a specification:

This invention relates to rings of ring and traveler spinning machines or frames; and consists in a ring made with two races, so that when one race is worn and unfit for use with a traveler the ring need only to be inverted or turned over to bring uppermost the unworn race; also, in the combination, with a double-raced ring, of holding devices attached to the ring-rail, and overlapping the edge of the unused race, to confine the ring to the ring-rail.

Figure 1:
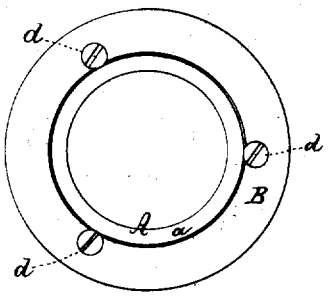
Figure 2:
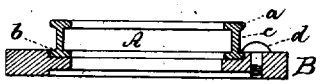

In the drawing, Figure 1 is a top view of one of the improved double rings shown as resting on the surface of a ring-rail. Fig. 2 is a cross-section of the same.

A is the ring, *c* its body, and *a b* its two races, arranged at opposite ends, and adapted to receive and guide a traveler in the usual manner. The ring is herein shown as composed of a thin cylindrical body or annulus, *c*, of substantially uniform thickness, and having races *a b* projecting one from each end of the annulus. B is the ring-rail. The ring rests on the rail B, or within a shallow socket, or a cavity, *c'*, arranged therein, and the socket or cavity receives that one of the races (*a* or *b*) not in use. This ring may be moved laterally in order that it may be properly centralized with relation to the spindle turning therein, in the usual manner. In the ring rail or supporter are placed holding devices (shown as a series of clamp-screws) *d d d*, with heads or flanges to project over and bear on the lower race, (shown in the drawing as *b*,) and these holding devices confine the ring to the rail or supporter, and permit the ready detachment and inversion of the ring when the upper race is worn, and also its adjustment.

The holders or screws *d* do not, by their movement, adjust the position of the ring centrally with relation to the opening in the ring-rail, but they do overlap and confine the ring to the ring-rail, and the ring is adjusted by hand.

It costs no more to construct this improved double ring than it does to construct a ring with a single race; in fact, this double ring can be made cheaper than can the ordinary spinning-ring with a shank to fit the ring-rail, and the weight of the double ring as constructed is but little in comparison with the weight of the ordinary ring, and this saving of weight, and consequently of metal, is of importance, because it is a saving in the cost of manufacture, and the weight of the ring-rail is decreased materially.

The cylindrical body *c* is preferably of a length just sufficient to allow the traveler, when running on race *a* or *b*, to pass freely, and this improved ring is very light and compact.

What is claimed is—

1. A spinning-ring composed of an annulus and two connected races, substantially as described.

2. The combination of a ring having two races with a ring-rail, and with holding devices carried by the rail, to operate in connection with the lower or unused race, and confine the ring to the rail and about the spindle-receiving passage through the rail, substantially as and for the purpose described.

3. The double-raced spinning-ring, combined with a ring-rail having spindle-receiving openings, and arranged within a socket at the top of the ring-rail, substantially as described.

GEORGE DRAPER.
WM. F. DRAPER.

Witnesses:
T. G. KENT,
E. D. BANCROFT.